July 23, 1963   C. H. CHRISTENSON   3,098,632
COMBINATION AIRCRAFT FUEL TANK AND POWERPLANT ARRANGEMENT
Filed Sept. 11, 1953   2 Sheets-Sheet 1
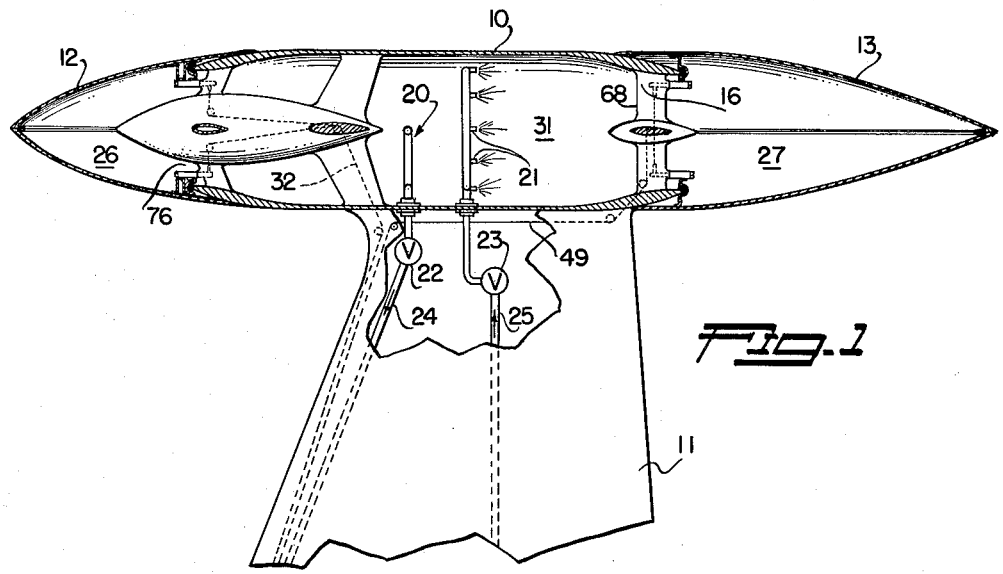
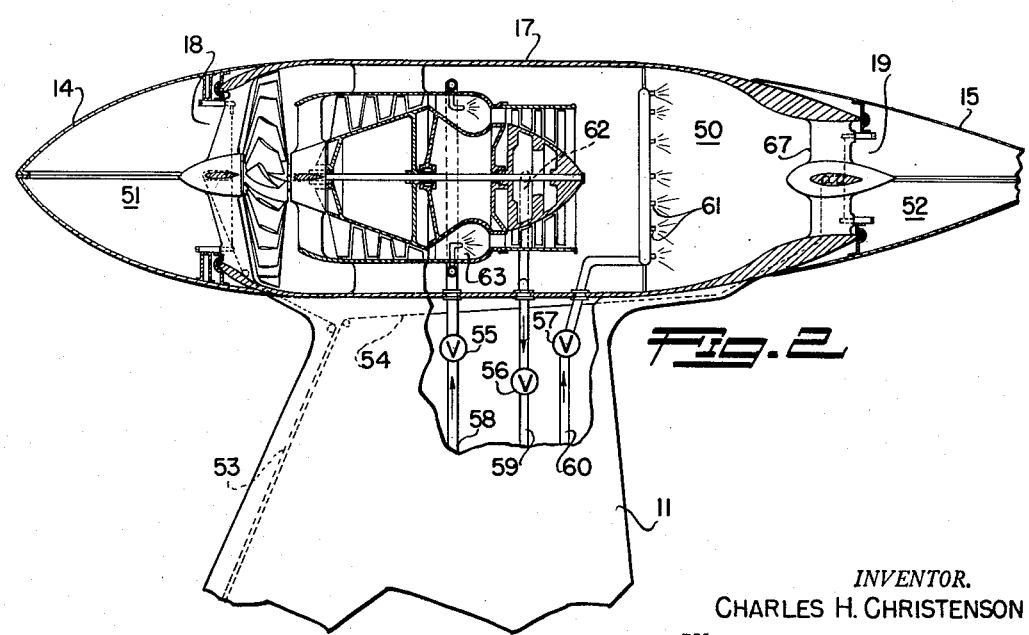
INVENTOR.
CHARLES H. CHRISTENSON
BY
*George A. Sullivan*
Agent July 23, 1963
C. H. CHRISTENSON
3,098,632
COMBINATION AIRCRAFT FUEL TANK AND POWERPLANT ARRANGEMENT
Filed Sept. 11, 1953
2 Sheets-Sheet 2
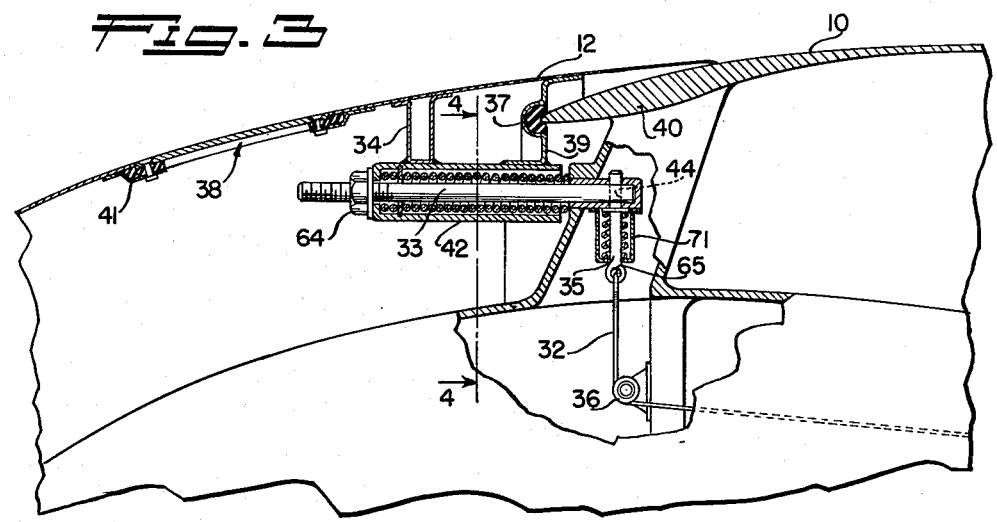
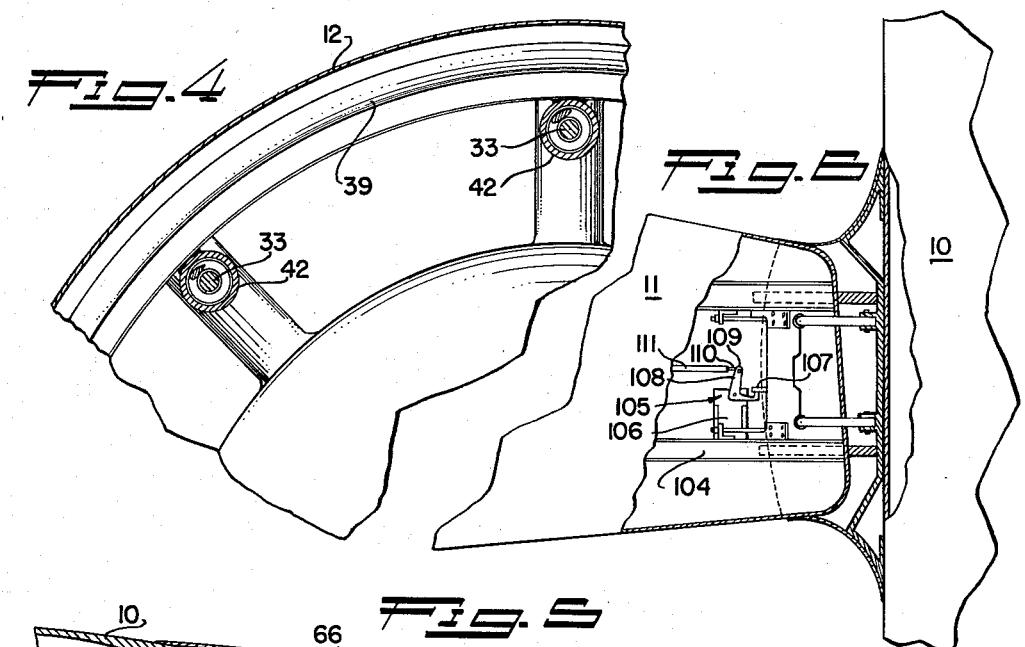
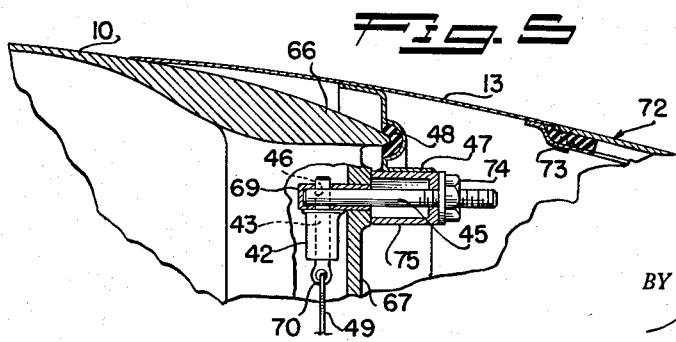
INVENTOR.
CHARLES H. CHRISTENSON
BY
George C. Sullivan
Agent United States Patent Office 3,098,632
Patented July 23, 1963

3,098,632
COMBINATION AIRCRAFT FUEL TANK AND
POWERPLANT ARRANGEMENT
Charles H. Christenson, Burbank, Calif., assignor to
Lockheed Aircraft Corporation, Burbank, Calif.
Filed Sept. 11, 1953, Ser. No. 379,641
9 Claims. (Cl. 244—135)

This invention relates to aircraft construction in general and more particularly to a jettisonable fuel tank and powerplant arrangement for carrying fuel in an aircraft.

It has been the practice to carry reserve fuel, particularly in military types of aircraft for the purpose of extending their range of operation, by employing external wing tanks. Such wing tanks are suspended from the wings at intermediate points along the wing span or at the wing tips. It has also been the practice to carry auxiliary powerplants, particularly in military types of aircraft, for the purpose of increasing their power at the moment of taking off or for increasing speed, by employing such auxiliary external powerplants, said powerplants being suspended under the wings at intermediate points along the wing span. Such arrangements, while serving to increase the power available has resulted, however, in an undesirable penalty in the way of increased parasitic drag with its attendant reduction of speed, climb, and fuel economy when the auxiliary powerplants are not in operation.

It has been discovered that external auxiliary powerplants of the ducted compressor and ram jet types may also be used, as this invention will hereinafter disclose, as auxiliary fuel tanks. This auxiliary fuel tank adaptation will increase the useable fuel load and, by the addition of the features of this invention, will at the same time improve the aerodynamic characteristics of the aircraft. It is also possible, when the necessity may arise, to jettison the fuel tank and powerplant assembly.

It is, therefore, an object of this invention to provide a method of utilizing the space or combustion chamber within the confines of the body of a ducted compressor powerplant as a fuel container.

It is a further object of this invention to provide a method of utilizing the space or combustion chamber within the confines of the body of a ram jet powerplant as a fuel carrying container.

It is another object of this invention to provide means of utilizing the extra fuel carried in the auxiliary fuel tank powerplant combination prior to entering the combat zone, then to jettison the nose and tail coverings of the auxiliary powerplants and use the auxiliary powerplants to increase combat effectiveness.

It is still another object of this invention to provide means of jettisoning the fuel tank powerplant combination.

It is still a further object of this invention to improve the aerodynamic characteristics of an aircraft which uses the external type of auxiliary powerplants.

These and other objects and features of novelty will become evident hereinafter in the description which, together with the following drawings, illustrate preferred embodiments of the invention.

FIGURE 1 is a plan view depicting a fragmentary section of an airplane wing with the present invention installed in conjunction with a ram jet powerplant;

FIGURE 2 is a plan view depicting a fragmentary section of an airplane wing with the present invention installed in conjunction with a ducted compressor powerplant;

FIGURE 3 is a detail fragmentary sectional view of a portion of FIGURES 1 and 2;

FIGURE 4 is an enlarged fragmentary transverse sectional view of FIGURE 3 at line 4—4;

FIGURE 5 is a sectional view of a portion of the structure shown in FIGURE 1 and FIGURE 2; and FIGURE 6 is a fragmentary plan view shown partly in section of the arrangement for jettisoning the fuel tank and powerplant arrangement.

Referring now to the drawings in which like reference numbers refer to corresponding parts throughout the several figures, the apparatus of the invention is as follows:

With reference particularly to FIGURE 1, a ram jet powerplant 10 is shown attached to the tip of an aircraft wing 11. The air intake opening 76 of the ram jet powerplant 10 is shown covered by a hollow streamlined closure 12. There is also shown in FIGURE 1 a hollow streamlined closure 13 attached to the ram jet powerplant 10 which is utilized to enclose the aperture 16 from which the propulsion jet air is expelled from the ram jet powerplant 10. As can be readily ascertained from FIGURE 1, the two coverings, 12–13, are slightly dissimilar as to geometric configuration. This depiction, however, is not intended to imply the absolute necessity of such dissimiliarity as interchangeability between the two coverings 12–13 is contemplated. In FIGURE 2 there are shown hollow streamlined closures 14—15, positioned in such a manner that one closure 14 covers the forward air intake opening 18 of a ducted compressor powerplant 17 and the other hollow streamlined closure 15 encloses the aft opening 19 of the ducted compressor powerplant 17 from which the propulsion jet is expelled. As can be readily ascertained from FIGURE 2, the two coverings 14—15 are slightly dissimilar as to geometric configuration. This dissimilarity, however, is not intended to imply the absolute necessity of such dissimilarity as interchangeability between the two coverings 14—15, is contemplated. In FIGURE 1 the space or combustion chamber 31, contained within the body of the ram jet powerplant 10, the area 26 enclosed within the hollow streamlined closure 12 of the air intake opening 76 of the ram jet powerplant 10, together with the area 27 enclosed within the hollow streamlined closure 13 which encloses the aft orifice 16 from which the propulson jet from the ram jet powerplant 10 is to be expelled, are all used to contain fuel. In FIGURE 1 is shown means 20 by which the fuel carried within the space or combustion chamber 31 contained within the body of the ram jet power unit 10 and the air spaces 26 and 27—fore 26 and aft 27—hollow streamlined closures 12—13 are made available through the fuel line 24 for use by the main propulsion units of the aircraft to which the auxiliary ram jet powerplant 10 is attached. In FIGURE 1, a valve 22 is shown inserted in the line 24 in order to control the flow from the auxiliary fuel source. The said valve 22 may be controlled from any remotely located position by various well known mechanical or electrical means, the direction of movement or flow of the fuel in the fuel line 24 being away from the said fuel containing enclosures in an inboard direction, as indicated by an arrow. Still referring to FIGURE 1 there is seen the fuel outlets 21 of the ram jet powerplant 10 by which means fuel from other sources on or in the airplane may be introduced into the said ram jet powerplant 10. Fuel to the outlets 21 is provided by fuel line 25 in which is inserted a valve 23 to control the flow of fuel to the ram jet powerplant 10 from other fuel sources, in this case the direction or movement of the fuel being in an outboard direction from an inboard fuel source to the ram jet powerplant 10, as indicated by an arrow. The valve 23 may be controlled from any remotely located position by various well known mechanical or electrical means.

Referring again to FIGURE 2, there is seen a simplified schematic representation of a ducted compressor powerplant 17 with the associated hollow streamlined closure 14 enclosing the air intake opening 18 and also another similar hollow streamlined closure 15 positioned so as to enclose the opening 19 by which the jet from the ducted compressor powerplant 17 is expelled. The space or combustion chamber 50, which is available within the body of the ducted compressor powerplant 17, together with the space 51 contained within the forward hollow streamlined closure 14 which is positioned to cover the forward air intake opening 18 of the said ducted compressor powerplant 17 and the air space 52 contained within the aft hollow streamlined closure 15 which is utilized to enclose the aft aperture 19 by which air from the ducted compressor powerplant 17 is expelled, are all used to contain fuel. In FIGURE 2 is shown the opening 62 by which means the fuel carried within the space or combustion chamber 50 contained within the body of the ducted compressor powerplant 17 and the air spaces 51 and 52 incorporated within the fore and aft hollow streamlined closures 14 and 15 is made available through the fuel line 59 for use by the main propulsion unit of the aircraft to which the auxiliary ducted compressor powerplant 17 is attached. In FIGURE 2, a valve 56 is shown inserted in the line 59 in order to shut off the fuel flow from the auxiliary fuel source. The said valve 56 may be controlled from any remotely located position by various well known mechanical or electrical means, the direction of movement or flow of the fuel in the fuel line 59 being away from the said fuel containing enclosures in an inboard direction, as indicated by an arrow. Still considering FIGURE 2, there is shown fuel outlets 61 and 63 of the ducted compressor powerplant 17 by which means fuel from other sources on or in the airplane may be introduced into the said ducted compressor powerplant 17, fuel to the outlets 61 and 63 being provided by fuel lines 58 and 60 in which are inserted valves 55 and 57 to control the flow of fuel to the ducted compressor powerplant 17, in this case the direction or movement of the fuel being in an outboard direction from an inboard fuel source to the ducted compressor powerplant 17, as indicated by an arrow. The valves 55 and 57 may be controlled from any remotely located position by various well known mechanical or electrical means.

In FIGURE 3 there is shown a method of attachment and releasing the hollow streamlined closure 12 which is used to enclose the air intake opening 76 of the ram jet powerplant 10. The forward hollow streamlined closure 12 is detachable by releasing the applicable locking devices which, in the present invention, takes the form of a spring loaded locking bolt 33, the said spring loaded locking bolt 33 being attached to the hollow streamlined closure 12 by supporting brackets 34 and 39. Bracket 34 is primarily a support attachment for a spring loaded locking bolt housing 42 whereas bracket 39, located at the lip 40 of the ram jet powerplant 10, is also utilized to provide a mounting means for the seal 37, joining the hollow streamlined closure 12 and the ram jet powerplant 10, the seal 37 being a fuel resistant rubber composition or synthetic rubber, or the like. The said locking devices are positioned around the inside periphery of the hollow streamlined closure in whatever number that may be desired in order to carry out the intentions of this invention. The lock bolt 33, FIGURE 3, is shown under spring loading and positioned in its housing 42, the spring loading of the said lock bolt 33 being adjustable by means of the spring loading adjustment nut 64.

There is shown, FIGURE 3, a locking pin 35, which is also under spring loading, positioned at one end of the lock bolt 33. A hole 44 is drilled transversely through the lock bolt 33 through which the lock pin 35 is inserted in order to restrain the said locking bolt 33 in its spring tension and locked position, locking pin 35 being shown in a locking pin housing 71. Attached to one end of the locking pin 35 through an eyelet 65 is a cable 32 which is used to withdraw the said locking pin 35 and thus releasing the spring loaded locking bolt 33 from its locked position. A mechanical means is shown by which the releasing mechanism can be operated remotely by use of the cable 32 and suitable located pulley brackets 36. It is desired to release the forward hollow streamlined closure 12 in such a manner as to tilt or cant the nose of the streamlined closure 12 into the relative wind of the airplane so as to create an isometric pressure distribution and thus bring about a positive separation. A difference of spring or unequal tension is applied to any desired spring tension locking bolts 33 by means of the spring tension locking bolt adjusting nut 64, which will cause a sideways tilt or cant to the nose of the streamlined closure during the releasing operation. The method of attachment, locking and releasing herein described for the hollow streamlined closure 12 of the ram jet powerplant 10 is likewise applicable to the hollow streamlined closure 14 of the ducted compressor powerplant 17.

FIGURE 3 shows a means of ingress into the forward hollow streamlined closure 12, which allows adjustments to be made to the spring tension locking bolt adjusting nut 64. These access openings 38 are arranged around the surface of the hollow streamlined closure 12 in such numbers and locations as to provide a ready access in order to make the above mentioned adjustments. The access openings 38 are also provided with seals 41 which may be of a fuel resistant rubber composition or synthetic rubber, or the like. Access openings 72 are arranged around the surface of the aft hollow streamlined closure 13 in such numbers and locations as to provide ready access to the lock bolt adjusting nut 74. These said access openings 72 are also provided with suitable fuel resistant rubber composition or synthetic rubber seals 73, or the like. The means of ingress into the forward hollow streamlined closure 12 and the aft hollow streamlined closure 13 of the ram jet powerplant 10 is likewise applicable to the forward hollow streamlined closure 14 and the aft hollow streamlined closure 15 of the ducted compressor powerplant 17.

The aft hollow streamlined closures 13 and 15 heretofore mentioned are released by a somewhat similar device as used on the forward hollow streamlined closures 12 and 14. In FIGURE 5 there is shown the locking means which is now described. A locking bolt 45 is shown positioned in its housing 75, said housing 75 being attached to the aft hollow streamlined closure 13 by means of a bracket 47. Incorporated within the design of the bracket 47 is the sealing means 48 which may be of a fuel resistant rubber composition or synthetic rubber, or the like. The bracket 47 and seal 48 is positioned so as to seal off the joint or connection between the lip 66 of the power unit to which it is attached and the aft hollow streamlined closures 13—15. A portion of the lock bolt 45 is housed in a fitting 69 attached to a strut 67—68. Also mounted on the fitting 69 is the housing 42 for the lock bolt locking pin 43. The said locking pin 43 is shown projecting transversely through, by means of a hole 46, the locking bolt 45 thus restraining the said locking bolt 45 in a locked position. A cable 49 is threaded through an eyelet 70 on one end of the locking pin 43. This cable 49 is the means whereby the locking pin 43 is extracted from the hole 46 in the locking bolt 45, thus allowing the aft hollow streamlined closures "13—15" to be removed. As will be noted, the locking means, FIGURE 5, is not spring loaded as it is the intention of this invention to first dispose or remove the forward hollow streamlined closures 12—14 and then allow the passage of ram air through the power units 10—17 to blow off the aft hollow streamlined closures "13—15." It is possible, however, to spring load the aft locking bolt 45 if so desired, but for purposes of simplification the said aft locking bolt 45 is shown without the spring loaded feature. The withdrawing of each of the locking bolt locking pins 35 and 43, by means of the attached cables 32 and 49, and the resulting freeing of the forward and aft hollow streamlined closures 12 and 13, 14 and 15, allows air to pass through the forward air intake openings 76 and 18 through the powerplants 10 and 17, and out of the aft air expelling openings 16 and 19. This initial passage of air can be used to purge the bodies of the power units of any fuel that may remain in the said power units prior to their operation as auxiliary power units.

Through the arrangement shown, FIGURE 6, which is covered by United States Patent Number 2,421,699, the fuel tank and powerplant arrangement can also be jettisoned, thus greatly decreasing the aerodynamic drag and load carried by the aircraft and, as a result, improving the maneuverability of the said aircraft. A bell crank 105 pivotally supported upon an angle clip 106 extending from the inner surface of the web of the wing beam 104 serves to actuate the release liner 107. The lever 108 of the bell crank 105 is connected at 109 with the outer end of a Bowden cable 110 which extends inward through the wing through a Bowden sheating 111 to a control handle, said control handle being located at any desired remote position. In addition to increasing the return range of the aircraft this feature is of great advantage in a combat aircraft as it will allow the operator of the aircraft to jettison a powerplant that has developed a hazardous malfunction.

Although the drawings show the fuel tank and powerplant arrangement used only in conjunction with an aircraft wing, it can be readily seen that attachment to other structure of the aircraft, such as the fuselage, is possible.

The operation of the present invention is as follows:

The aircraft takes off or is airborne with all fuel carrying tanks or containers filled. The fore and aft hollow streamlined closures are securely locked to the fore and aft openings of either the ram jet or ducted compressor powerplant that is being used. The areas within the hollow streamlined closures and the space or combustion chamber contained within the body of the power unit are filled with fuel. Fuel to the primary or main power units may be first used from the fuel tank and powerplant arrangement if so desired in order to gain the maximum advantage of the additional fuel carried by the use of this invention. At any time the pilot or aircraft operator desires he can jettison the streamlined closures covering the fore and aft openings of the power unit by releasing the locking bolts by applying force to the cables attached to the locking bolts' locking pins. The fore streamlined closure is jettisoned by the spring loaded locking bolt, the aft streamlined closure is removed by the force of the ram air passing through the power unit and the powerplant is now in a position to be used for auxiliary power. When the need for the auxiliary power has passed, the pilot may jettison the power unit as previously described. If desired, the pilot may also jettison the fuel tank and powerplant combination without having utilized the powerplant. In either case the airplane weight and drag will be materially reduced and return range will be increased. The pilot may, at any time, jettison the fuel tank and powerplant arrangement as heretofore described. The aforementioned jettisoning of the fuel tank and powerplant arrangement will materially lighten the load being carried by the airplane and will, consequently, increase the airplane maneuverability.

Having described the invention it is not intended to be limited to the specific details herein set out, but reservations of any variations or modifications that may be apparent to anyone skilled in the art or fall within the scope of the following claims is hereby made.

I claim:

1. In combination with an airplane, jettisonable tanks suspended externally therefrom, comprising streamlined ducts, jet type powerplants mounted in said ducts, fairings normally closing said ducts, and means to jettison said fairings whereby to convert said tanks into jet type powerplants.

2. The combination of claim 1 wherein the jet type powerplants are in the form of ram jets.

3. The combination of claim 1 wherein the jet type powerplants are in the form of ducted turbo jets.

4. Jettisonable external fuel tanks for airplanes comprising an approximately cylindrical streamlined shell forming a duct open at both ends, a jet type powerplant mounted in said duct, streamlined end closures for said ducts arranged to seal against the duct openings, whereby to convert the duct into a fuel tank, and means to jettison said end closures, whereby to convert the duct into a jet type powerplant.

5. A jettisonable fuel tank as defined in claim 4 wherein the jet type powerplant is a ram jet.

6. A jettisonable fuel tank as defined in claim 4 wherein the jet type powerplant is a turbo jet.

7. In combination with an airplane having normal fuel system, a wing tip tank comprising a streamlined shell forming an open-ended duct, streamlined end closures for the open ends of said duct forming said duct into a fuel tank, means connecting said duct to the fuel system of the airplane, means for jettisoning the end closures for the open ends of said duct, a jet powerplant mounted in said duct, and means for supplying fuel from the normal fuel system to said jet powerplant.

8. A combination as defined in claim 7 wherein the jet powerplant is a ram jet.

9. A combination as defined in claim 7 wherein the jet powerplant is a turbo jet.

References Cited in the file of this patent

UNITED STATES PATENTS

| | | |
|---|---|---|
| 2,437,353 | Gliwa | Mar. 9, 1948 |
| 2,470,120 | Walker | May 17, 1949 |
| 2,505,604 | Clark | Apr. 25, 1950 |
| 2,584,961 | Beck | Feb. 5, 1952 |

FOREIGN PATENTS

| | | |
|---|---|---|
| 713,321 | Germany | Nov. 15, 1941 |